(12) United States Patent
Metke et al.

(10) Patent No.: US 7,562,148 B2
(45) Date of Patent: Jul. 14, 2009

(54) DISTRIBUTED DOMAIN NAME SERVICE

(75) Inventors: Anthony R. Metke, Naperville, IL (US); Robert D. LoGalbo, Rolling Meadows, IL (US); Aparna Pandey, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 717 days.

(21) Appl. No.: 11/018,301

(22) Filed: Dec. 21, 2004

(65) Prior Publication Data
US 2006/0135205 A1      Jun. 22, 2006

(51) Int. Cl.
*G06F 15/16* (2006.01)
(52) U.S. Cl. .................. 709/228; 709/203; 709/227
(58) Field of Classification Search .......... 709/203, 709/227, 228
See application file for complete search history.

(56) References Cited

U.S. PATENT DOCUMENTS

| 6,434,627 | B1 |   | 8/2002  | Millet et al. |
| 6,480,508 | B1 | * | 11/2002 | Mwikalo et al. ........... 370/475 |
| 6,643,707 | B1 | * | 11/2003 | Booth ........................ 709/245 |
| 6,847,649 | B2 | * | 1/2005  | Sutanto ...................... 370/401 |
| 7,061,925 | B2 | * | 6/2006  | Joshi .......................... 370/401 |
| 2002/0049561 | A1 |   | 4/2002 | Garcia-Luna-Aceves et al. |
| 2002/0087726 | A1 |   | 7/2002 | Macpherson et al. |
| 2002/0133591 | A1 | * | 9/2002 | Makarios et al. ........... 709/225 |
| 2003/0225900 | A1 | * | 12/2003 | Morishige et al. ........... 709/230 |
| 2003/0233454 | A1 | * | 12/2003 | Alkhatib et al. ............. 709/226 |
| 2004/0246975 | A1 | * | 12/2004 | Joshi ...................... 370/395.31 |
| 2005/0086377 | A1 | * | 4/2005  | Aso ............................ 709/245 |
| 2006/0126535 | A1 | * | 6/2006  | Sherman .................... 370/254 |

FOREIGN PATENT DOCUMENTS

WO       2006068747 A3      6/2006

OTHER PUBLICATIONS

Engelstad et al. "Name resolution in mobile ad-hoc networks", Mar. 2003 pp. 1-5.*
Engelstad et al. "Name resolution in on-demand MANETS and over external IP Network", Jul. 2004 pp. 1-13.*
PCT International Search Report Application No. PCT/US05/41966 Dated Jul. 12, 2006 - 7 Pages.
Korean Patent Application No. 10-2007-7016794 - Final Rejection Dated Dec. 12, 2008 - 2 Pages.
Korean Patent Application No. 10-2007-7016794 - Rejection Dated Jul. 18, 2008 - 2 Pages.
P. Engelstad et al. - Name Resolution In On-Demand Manets And Over External IP Network - Dated May 11-15, 2003 - 9 Pages.

* cited by examiner

*Primary Examiner*—Phuoc Nguyen
(74) *Attorney, Agent, or Firm*—Randi L. Karpinia

(57) ABSTRACT

Distributed DNS in a wireless communication network comprising broadcasting by a first node a request message to a second node is disclosed. The request message comprises a hostname of the second node. The first node forwards the request message to the second node through intermediate nodes in the wireless communication network and the second node transmits a response message to the first node. The response message comprises a MAC address of the second node.

15 Claims, 9 Drawing Sheets

DISTRIBUTED DOMAIN NAME SERVICE

FIELD OF THE INVENTION

The present invention relates generally to wireless communication systems and in particular to the field of distributed domain name service in a wireless network.

BACKGROUND

Autonomous ad-hoc networks are networks that do not have a connection to an infrastructure and as such do not have access to the services that an infrastructure provides, such as a server that provides domain name service (DNS). Existing Internet Protocol (IP) based applications rely on a DNS server to function properly. Without access to a DNS server, existing IP applications in an ad-hoc network can not perform. Since modern communication is increasingly ad hoc and mobile, there is a need to provide DNS functionality for an ad hoc network.

Accordingly, there exists a need for a method of providing DNS functionality for an ad hoc network.

BRIEF DESCRIPTION OF THE FIGURES

The present invention is illustrated by way of example and not limitation in the accompanying figures, in which like references indicate similar elements, and in which.

Figure 1:
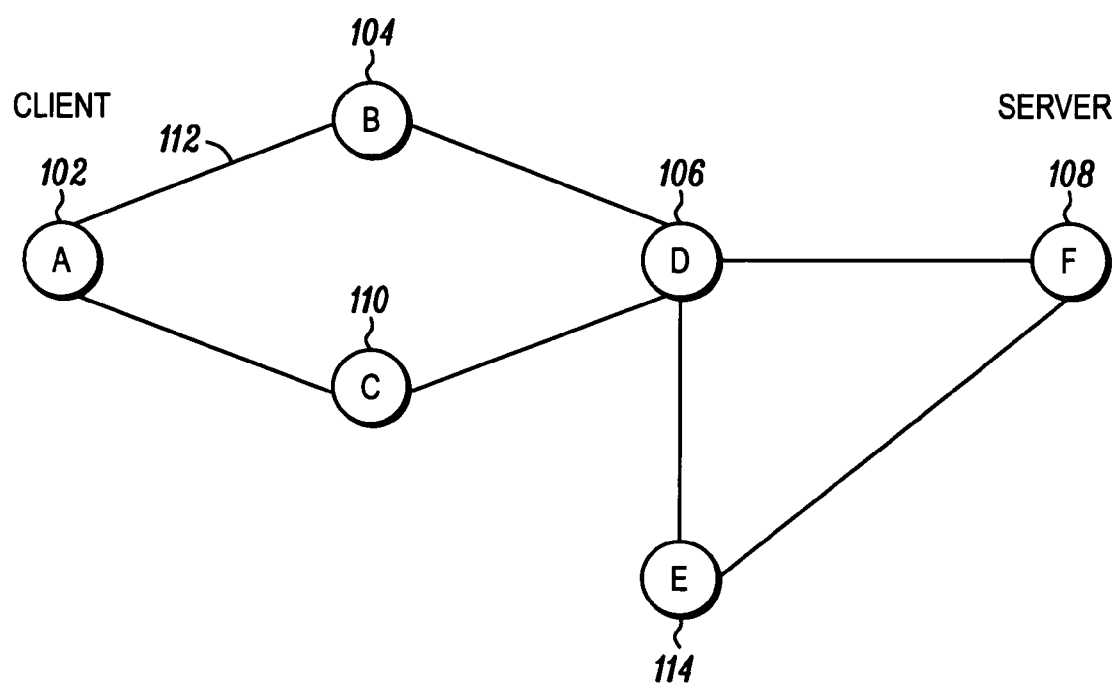
FIG. 1 is an example of a simple block diagram illustrating a wireless communication system in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail distributed DNS in accordance with the present invention, it should be observed that the present invention resides primarily in combinations of method steps and apparatus components related to distributed DNS. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIG. 1, a wireless communication system 100 according to the present invention illustratively includes a plurality of nodes connected by wireless communications links denoted by straight lines, e.g. 112. In an illustrative embodiment, the wireless communication system is an ad-hoc network comprising wireless communication devices forming a temporary network without the aid of any centralized administration or standard support services. The nodes may be any suitable type of wireless communications device capable of communicating within an ad-hoc network, such as computers, personal data assistants (PDAs), etc. with wireless modems, as well as others, as will be appreciated by those of skill in the art. Certain of the nodes may also be connected to a fixed communications infrastructure, if desired.

In FIG. 1, node A 102 is referred to as a client and node B is referred to as a server. The other nodes B 104, C 110, D 106, E 114 are referred to as intermediate nodes and forward communications from a client, e.g. node A 102, to a server, e.g. node F 108. A client is an endpoint of a communication which initiates a request for service to a server where the server is the recipient of the request. For purposes of illustration, node A 102 is chosen as the client and node F 108 is chosen as the server; however, any other node in the wireless communication system 100 may be the client and any other node in the wireless communication system 100 may be the server.

Figure 3:
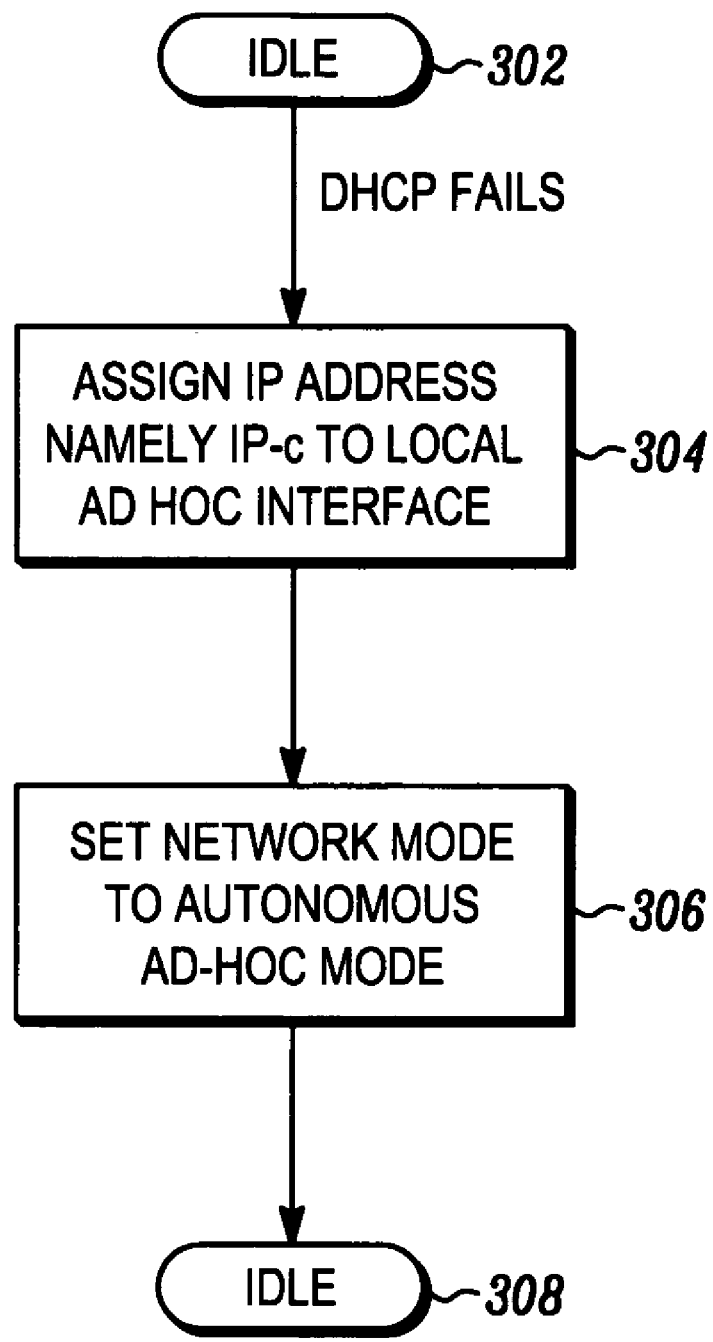
FIG. 3 is a flow chart for a function called by a node in the wireless communication system in accordance with some embodiments of the invention.

Referring to FIG. 3, initially, a node, e.g. node A 102, powers up and attempts to access the infrastructure (Block 302). During this power up process, the node requests a network address. As described herein, the network address disclosed is an IP address, but as is known in the art, other types of network addresses may be substituted herein. Thus, references to IP addresses are only references to embodiments of the present invention.

For example, in one embodiment, the node sends a Dynamic Host Host Configuration Protocol (DHCP) packet to a DHCP server. If a response to the DHCP packet is not received within a certain time period and/or within a certain number of attempts, then the node determines that DHCP failed. Having determined that DHCP failed, the node does not have an IP address for itself and assigns an IP address for itself (Block 304). As is known in the art, assigning the node an IP address can be performed a number of ways. For example, the IP address can be randomly chosen and if the node determines that another node in the wireless communication system 100 has the chosen IP address, then the node chooses another IP address. In any event, assigning the node an IP address may rely on knowledge of IP addresses that are not available for the node to use. Then, the node enters an autonomous ad-hoc mode where autonomous ad-hoc means that the node does not have access to the infrastructure (Block 306).

Figure 2:
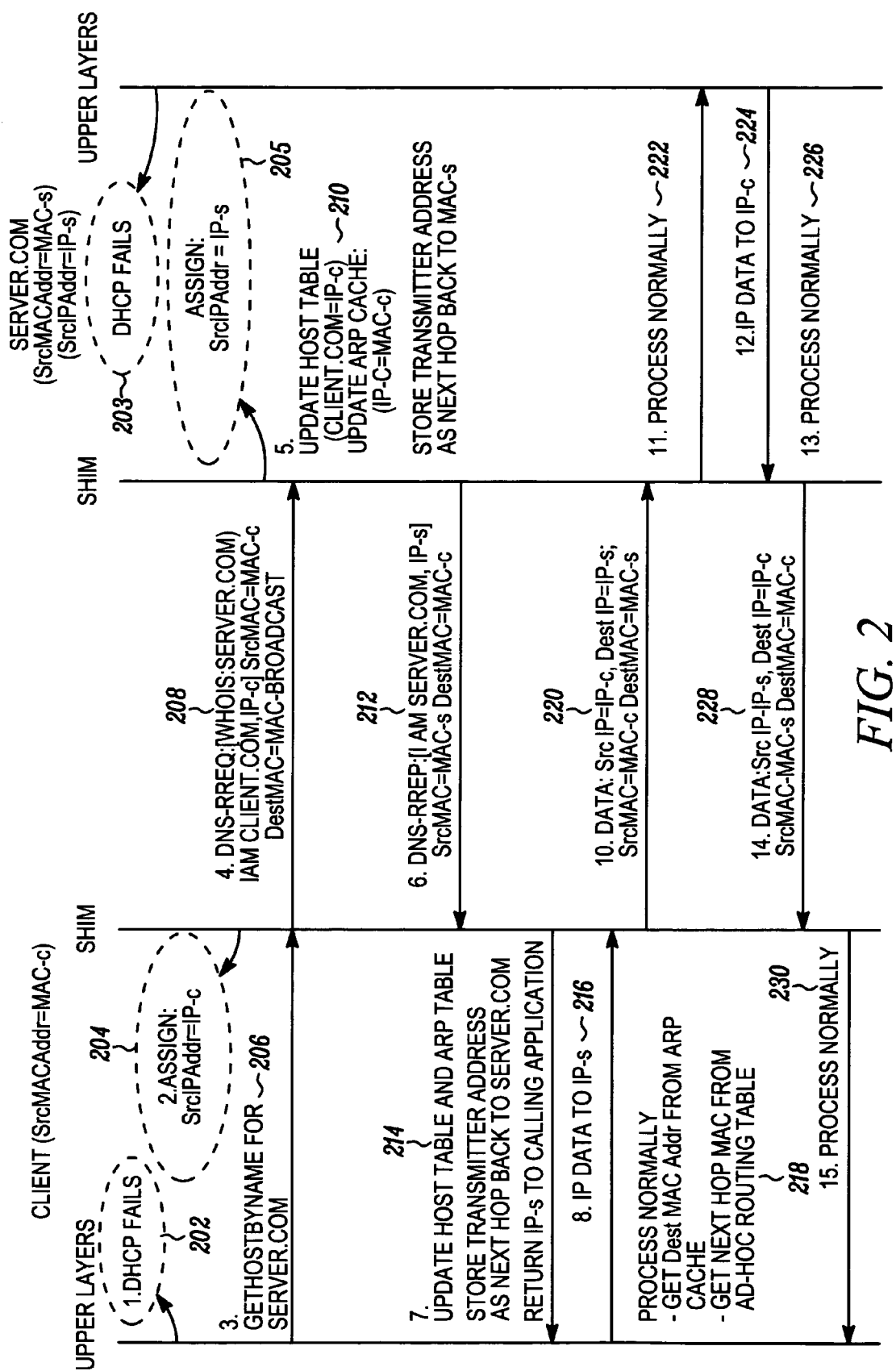
FIG. 2 is a message sequence illustrating a method for distributed DNS in accordance with some embodiments of the invention.
Figure 4:
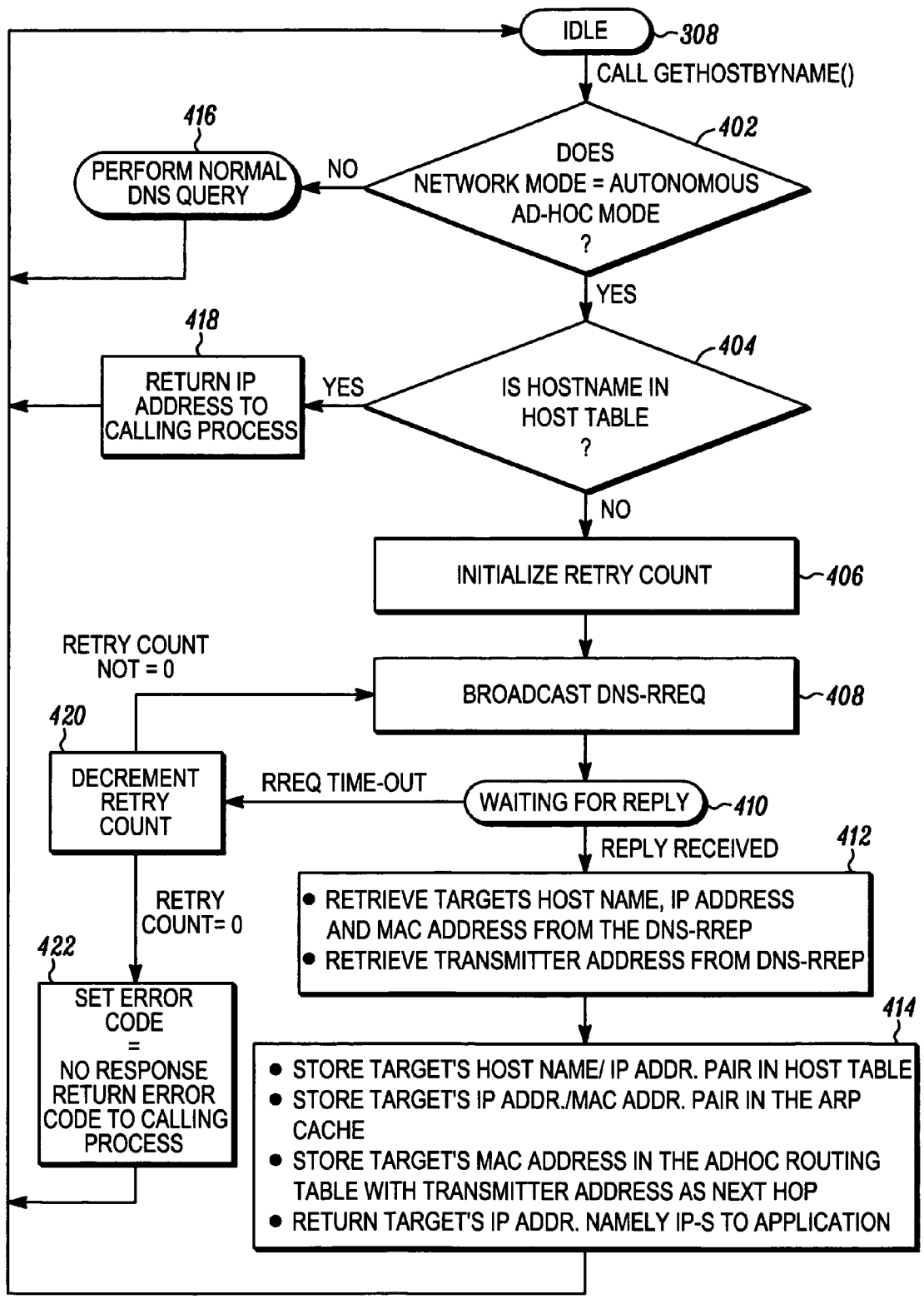
FIG. 4 is a flow chart for the functionality performed by a client in the wireless communication system in accordance with some embodiments of the invention.
Figure 5:
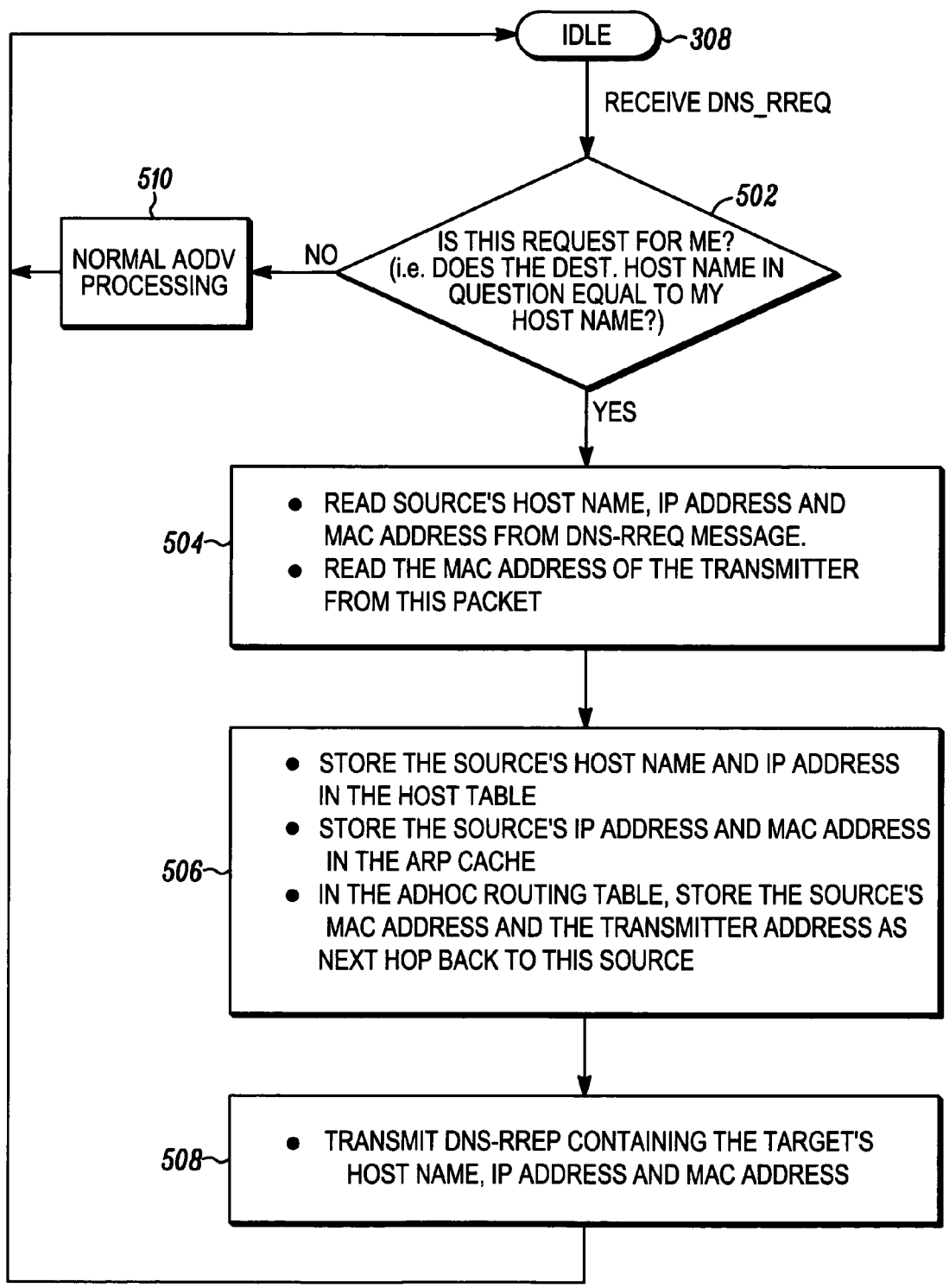
FIG. 5 is a flow chart for the functionality performed by a server in the wireless communication system in accordance with some embodiments of the invention.

A first embodiment of a method for distributed DNS in the wireless communication system 100 will now be described with reference to the message sequence chart of FIG. 2 and the flow charts of FIGS. 4 and 5. Having determined that DHCP failed (Block 202) and set the mode of the client to autonomous ad-hoc mode, the client assigns itself an IP address, e.g. IP-c. (Block 204). An application, such as a web browser, is started on the client and the application requires access to a host where the host is known by a host name, such as server.com. The application calls a function called gethostbyname (Block 206). If the client is not in autonomous ad-hoc mode (Block 402), namely the node has access to the infrastructure, then DNS services are provided by the infrastructure (Block 416). Otherwise, the client queries its hosts table for the desired host name (Block 404). If the desired host name is in the client's hosts table, then the corresponding IP address for the host name is returned to the application (Block 418). Otherwise, the client broadcasts a request message to receive a Media Access Control (MAC) address of the host. In one embodiment, the request message is termed a DNS route request (DNS-RREQ). The DNS-RREQ is broadcast in the wireless communication system and is sent to a neighboring node (Message 208, Block 408). The DNS-RREQ is sent as a broadcast message from node to node until it finds the server, e.g. node F 108. In one embodiment, the protocol used to send the DNS-RRLQ from node to node is based on the well known Ad-Hoc On Demand Distance Vector (AODV) protocol. In one embodiment, the DNS-RREQ includes the server's host name, e.g. server.com, and the IP address of the client. (Message 208)

The server has similarly attempted access to the infrastructure and requested an IP address by sending a DHCP packet to the DHCP server. If a response to the DHCP packet is not received within a certain time period, then the server determines that DHCP failed (Block 203). Having determined that DHCP failed, the server does not have an IP address for itself and enters an autonomous ad-hoc mode where autonomous ad-hoc means that the server does not have access to the infrastructure. The server assigns itself an IP address, e.g. IP-s (Block 205) similar to that followed by the client.

Continuing, when the server receives the DNS-RREQ from the client (Message 208), it first checks to see if the DNS-RREQ is for it (Block 502). If it is not, then the request is handled by normal AODV processing (Block 510). Otherwise, the server decodes the DNS-RREQ for the client's host name and MAC address (Block 504) and performs a mapping of the client's name to the client's IP address (Blocks 210, 504). Then, server's hosts table is updated with the client's host name and IP address. Further, in one embodiment, an IP routing table at the server may be updated to indicate the existence of a host specific route to the client. Note, as is known in the art, updating the IP routing table at the server is not necessary when the client's IP address is selected to be part of the server's local subnet. The client's IP address and MAC address are stored in an Address Resolution Protocol (ARP) cache. The client's IP address and MAC address are stored in the address translation table (Blocks 210, 506). The transmitter address is stored in the ad-hoc routing table as the next hop back to the client. For example, for the DNS-RREQ to be broadcast from node A 102 to node F 108, the transmitter address for the next hop back to the client may be node D 106. Finally, the server's MAC address and host name is sent to the client in a response message. In one embodiment, the response message is termed a DNS route response (DNS-RREP) (Message 212, Block 508). The DNS-RREP is transmitted from node to node until it reaches the client, e.g. node A 102. In one embodiment, the protocol used to send the DNS-RREP from node to node is based on AODV. In one embodiment, the DNS-RREP includes the host IP address, e.g. 10.1.5.148 and the IEEE MAC address, e.g. A0 21 3F C8 D6 14.

If for some reason, the DNS-RREP is not receive within a predetermined time out period, then the DNS-RREQ is retransmitted to the server (Block 420) until a predetermined number of retries have been exhausted (Block 422). If the client receives the DNS-RREP, then the client processes it. Namely, the client updates its hosts table with the server's host name and IP address (Blocks 214, 412). In one embodiment, the client may update its IP routing table to indicate the existence of a host specific route to the server. The client updates the address resolution protocol (ARP) cache with the received MAC address (Blocks 214, 414). Further, the transmitter address from the DNS-RREP is stored in the ad-hoc routing table as the next hop back to the server. For example, for the DNS-RREP to be broadcast from node F 108 to node A 102, the transmitter address for the next hop back to the client may be node B 104. Finally the IP address of the server is returned by the gethostbyname function to the calling application. Knowing this information, the application can continue to function.

As is known in the art, when the client has an IP data packet to send to the server (Message 216), the client's IP routing table is used to route the packet at Layer 3. Further, the client's ARP cache is used to retrieve the server's MAC address, and the client's ad-hoc routing table is used to determine the next hop to which the MAC layer frame will be forwarded (Block 218, Message 220). The MAC layer frame is routed through the wireless communication system 100 using the routing information that was created by the ADOV function during the DNS-RREQ/DNS-RREP exchange, until the IP data packet is received by the server. At the server, the destination IP address is processed (Block 222). When an IP data packet is sent back to the client (Messages 224, 228) the server processes the packet normally (Block 226). That is, standard methods can be deployed at each layer of the OSI or ARPANET model and no special modifications are required to any of the functions defined by each layer. Once the client receives the IP data packet, the client processes it (Block 230). To reiterate, in this first embodiment the sending and receiving of IP packets and/or MAC frames is handled as is known in the art. This is accomplished because the tables (e.g. the IP routing table, the ARP cache, and the ad-hoc routing table) necessary for sending and receiving IP packets and/or MAC frames are setup during the DNS-RERQ/DNS-RREP exchange.

Figure 6:
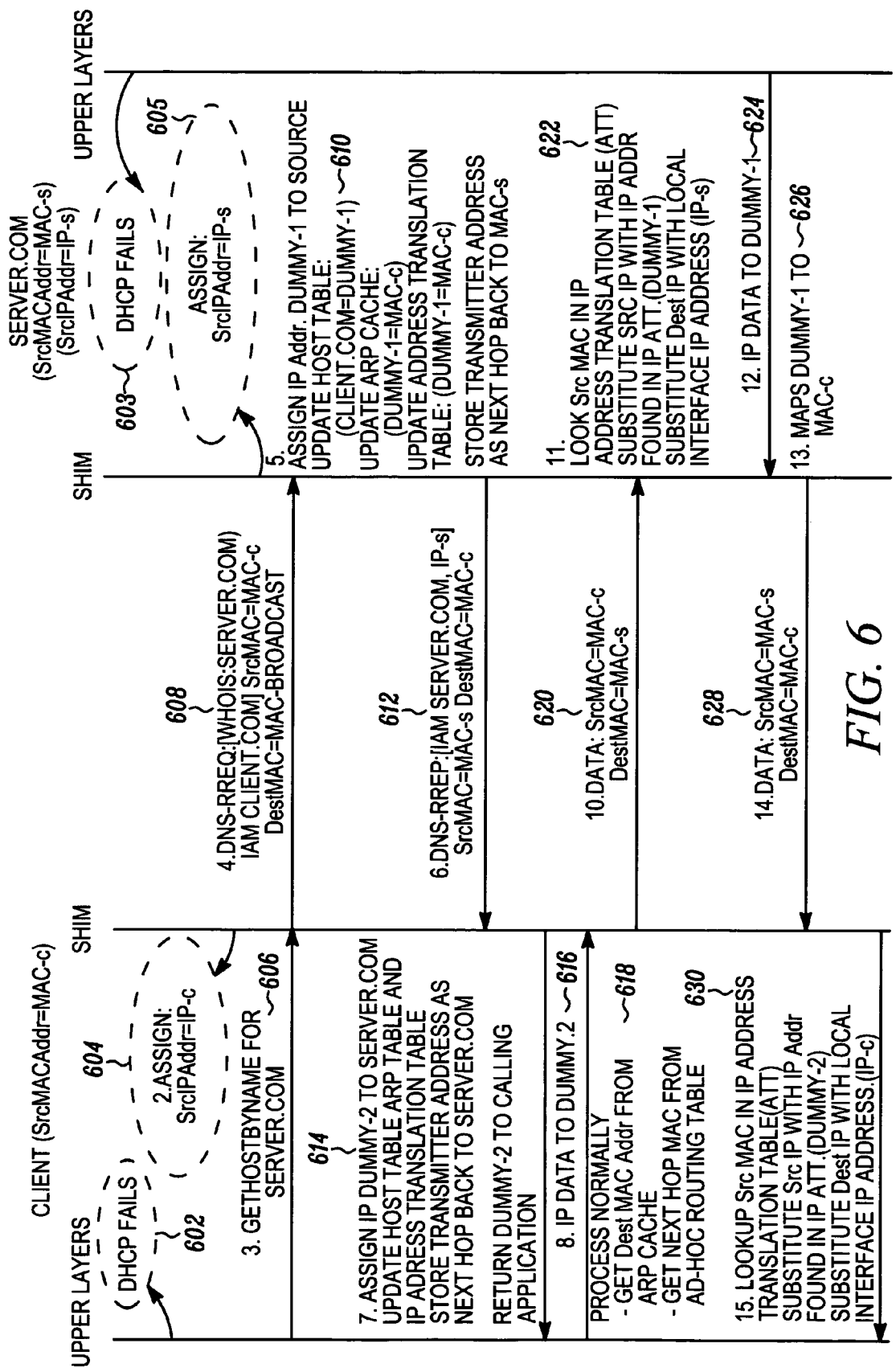
FIG. 6 is a message sequence illustrating a method for distributed DNS in accordance with some embodiments of the invention.
Figure 7:
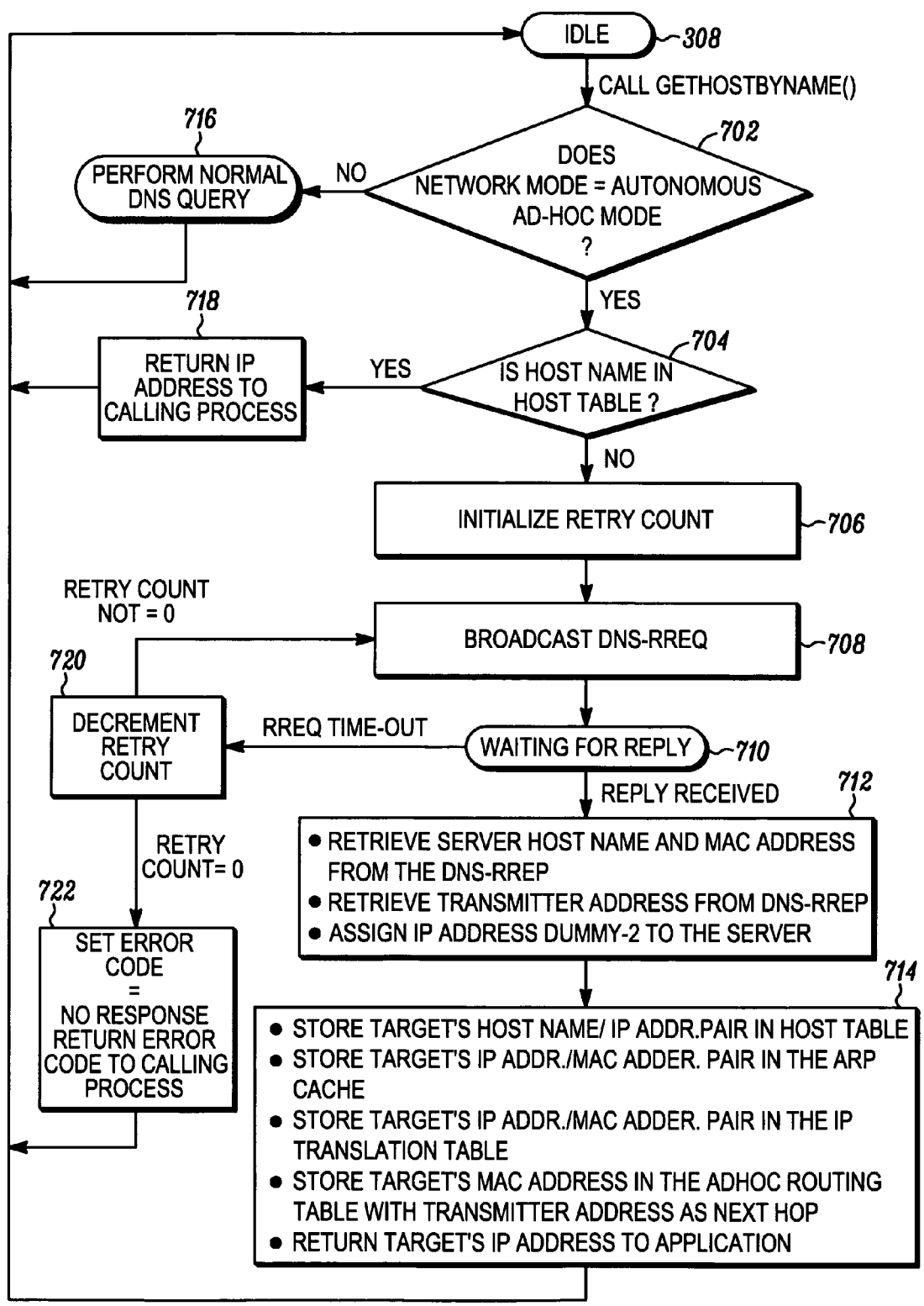
FIG. 7 is a flow chart for the functionality performed by a client in the wireless communication system in accordance with some embodiments of the invention.
Figure 8:
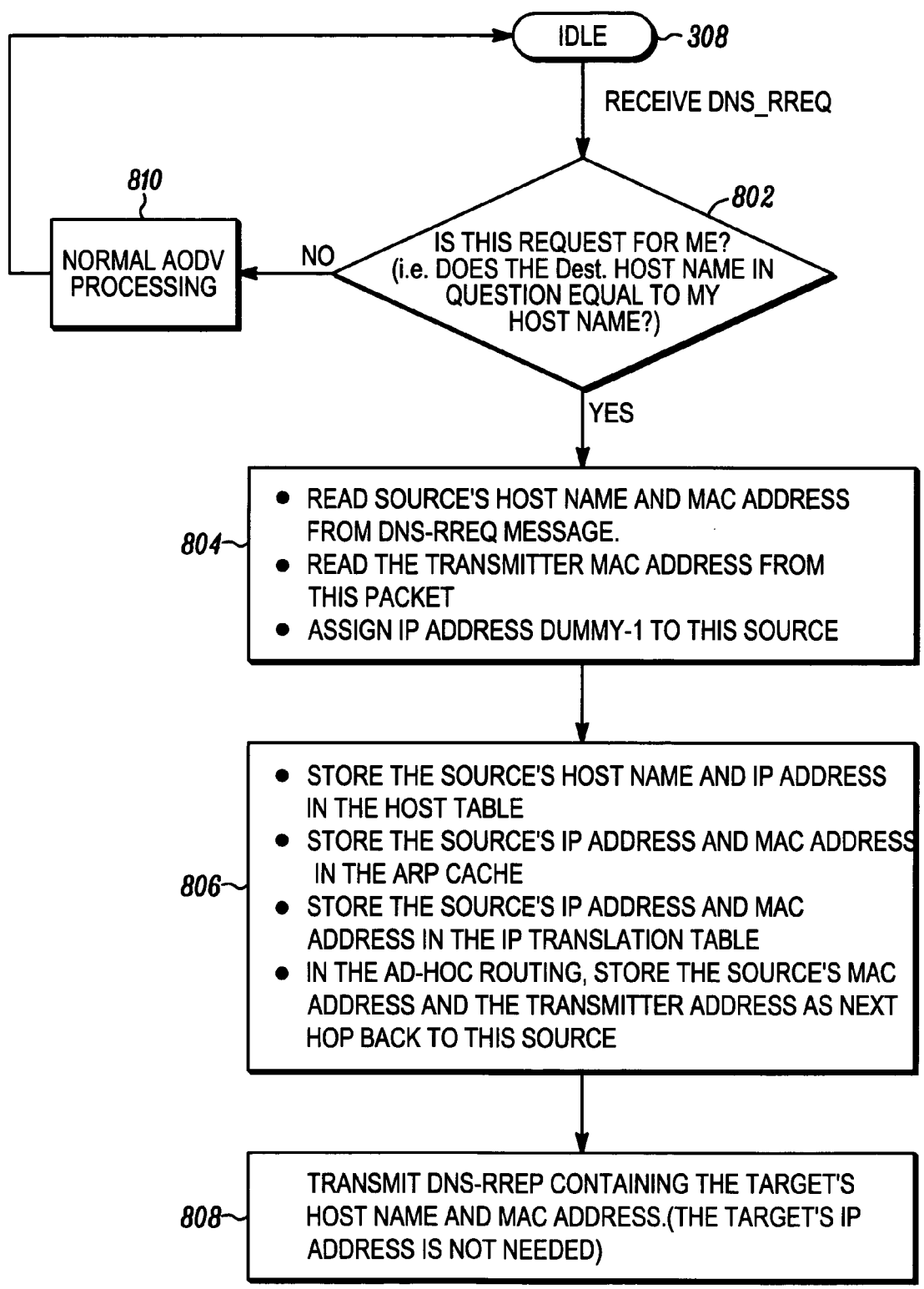
FIG. 8 is a flow chart for the functionality performed by a server in the wireless communication system in accordance with some embodiments of the invention.
Figure 9:
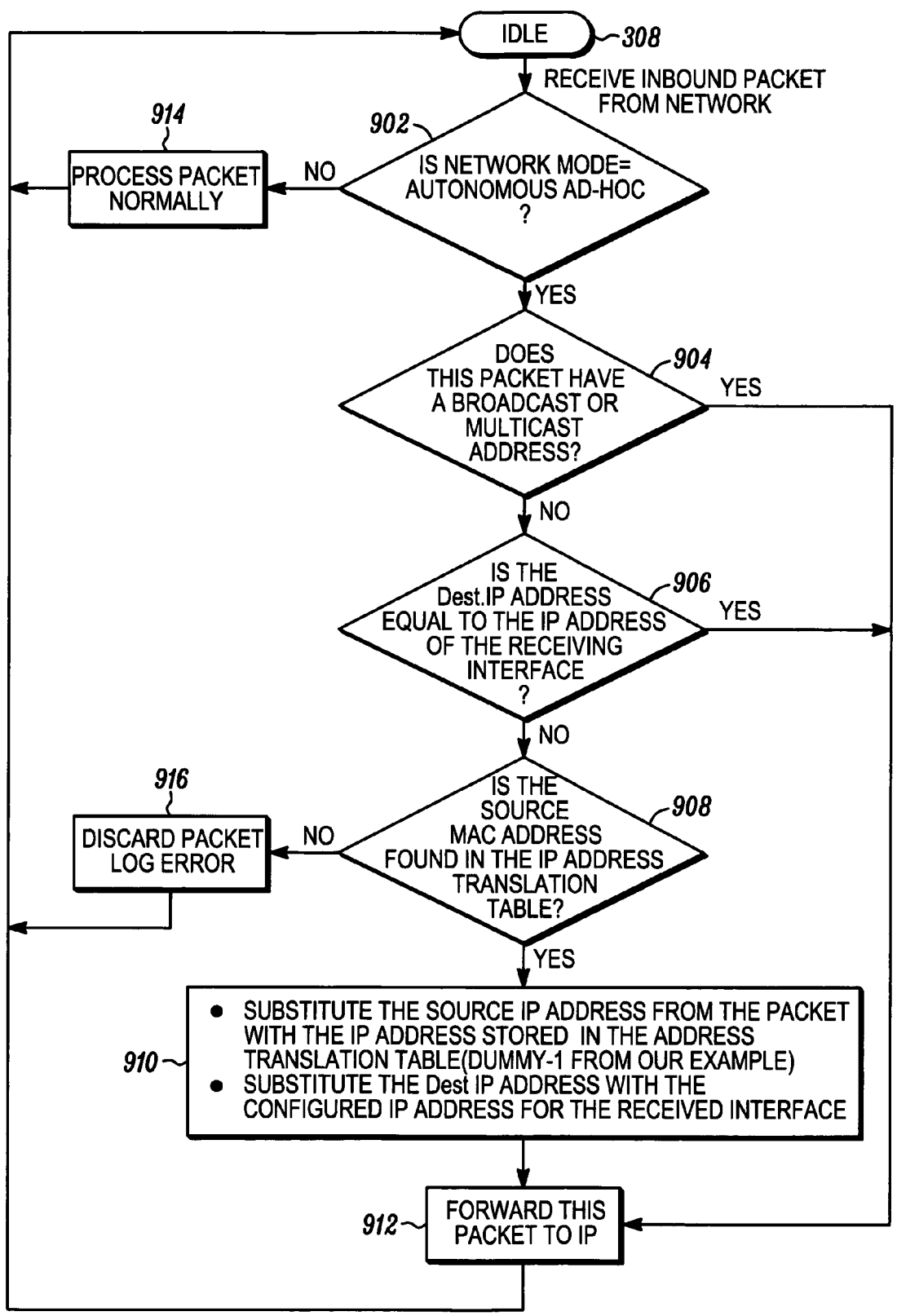
FIG. 9 is a flow chart for the functionality performed by a server in the wireless communication system in accordance with some embodiments of the invention.

A second embodiment of a method for distributed DNS in the wireless communication system 100 will now be described with reference to the message sequence chart of FIG. 6 and the flow charts of FIGS. 7 and 8. Having determined that DHCP failed (Block 602) and set the mode of the client to autonomous ad-hoc mode, the client assigns itself an IP address, e.g. IP-c. (Block 604). An application, such as a web browser, is started on the client and the application requires access to a host where the host is known by a host name, such as server.com. The application calls a function called gethostbyname (Block 606). If the client is not in autonomous ad-hoc mode (Block 702), namely the node has access to the infrastructure, then DNS services are provided by the infrastructure (Block 716). Otherwise, the client queries its hosts table for the desired host name (Block 704). If the desired host name is in the client's hosts table, then the corresponding IP address for the host name is returned to the application (Block 718). Otherwise, the client broadcasts a DNS route request (DNS-RREQ) to a neighboring node in the wireless communication system 100 (Message 608, Block 708). The DNS-RREQ is sent as a broadcast message from node to node until it finds the server, e.g. node F 108. In one embodiment, the protocol used to send the DNS-RREQ from node to node is called Ad-Hoc On Demand Distance Vector (AODV) protocol. In one embodiment, the DNS-RREQ includes the host name, e.g. server.com.

The server has similarly attempted access to the infrastructure and requested an IP address by sending a DHCP packet to the DNS server. If a response to the DHCP packet is not received within a certain time period, then the server determines that DHCP failed (Block 603). Having determined that DHCP failed, the server does not have an IP address for itself and enters an autonomous ad-hoc mode where autonomous ad-hoc means that the server does not have access to the infrastructure. The server assigns itself an IP address, e.g. IP-s (Block 605) similar to that followed by the client.

Continuing, when the server receives the DNS-RREQ from the client (Message 608), it first checks to see if the DNS-RREQ is for it (Block 802). If it is not, then the request is handled by AODV processing that is unmodified by an embodiment of the present invention (Block 810). Otherwise, the server decodes the DNS-RREQ for the client's host name and MAC address (Block 804). The server assigns to the client a local IP address and performs a mapping of the client's name to the client's IP address (Blocks 610, 804). As used herein, local means that only the node that has assigned the IP address requires the IP address for its local processing and the IP address does not have significance beyond the node that has assigned the address. Then, server's hosts table is updated with the client's host name and locally assigned IP address. The client's locally assigned IP address may be stored in the server's IP routing table. As is known in the art, the client's IP address does not need to be stored in the server's IP routing table when the client's IP address is selected to be a part of the server's local subnet. The client's IP address and MAC address are stored in the ARP cache. The ad-hoc routing table is also updated with the MAC address of the node that transmitted the DNS-RREQ as the next hop back to the client. For example, for the DNS-RREQ to be broadcast from node A 102 to node F 108, the transmitter address for the next hop back to the client may be node D 106. The client's IP address and MAC address are stored in the address translation table (Blocks 610, 806). Finally, the server's MAC address and host name is sent to the client in a DNS route response (DNS-RREP) (Message 612, Block 808). The DNS-RREP is transmitted from node to node until it finds the client, e.g. node A 102. In one embodiment, the protocol used to send the DNS-RREP from node to node is called AODV. In one embodiment, the DNS-RREP includes the host IP address, e.g. 105.7.21.1 and the MAC address, e.g. 64 21 CA A4 F0 DC.

If for some reason, the DNS-RREP is not receive within a predetermined time out period, then the DNS-RREQ is rebroadcast by the server (Block 720) until a predetermined number of retries have been exhausted (Block 722). If the client receives the DNS-RREP, then the client processes it. Namely, the client assigns a local IP address to the server, updates its hosts table with the server's locally assigned IP address and the server's host name (Blocks 614, 712). The client updates the address resolution protocol (ARP) cache with the received MAC address (Blocks 614, 714). The ad-hoc routing table is updated with the MAC address of the node which transmitted the DNS_RREP, as the next hop back to the server. Knowing the information in the IP routing table, the ARP cache, and the ad-hoc routing table, the application can continue to function.

As is known in the art, when the client has an IP data packet to send to the server (Message 616), the client uses the server's locally assigned IP address to retrieve the server's MAC address from its ARP cache (Block 618) and transmits a MAC frame containing the IP packet. The client no longer needs to have knowledge of the server's actual IP address to send an IP data packet to the server. The MAC frame is routed through the wireless communication system 100 until the IP data packet is received by the server. At the server, the destination IP address is checked to see if it is either multicast or equal to the IP address of the server (Blocks 904, 906). If it is, the server forwards the IP data packet to the network stack, e.g. IP stack, for processing. Otherwise, the server will check the Address Translation Table for the source MAC address of the received frame (Block 908). If the source MAC address is found in the Address Translation Table, the server substitutes the source IP address from the IP data packet with the IP address stored in the address translation table. The destination address in the IP data packet is substituted with the IP address of the interface on which the IP data packet was received (Blocks 910). Then the data packet is forwarded up to the IP stack which will process the packet (Block 912).

The server knows the client by the locally assigned IP address. When the server wishes to send a packet to the client, the server will retrieve the clients MAC address from the ARP cache. The server then transmits the frame to the next hop found in the ad-hoc routing table. Note that transmitted data packets are treated identically on the client and the server. Receive data packets are also treated identically on the client and the server. As is known in the art, the transmitted data packets are processed according to standard methods, and the received packets go through the address translation functions described above.

It will be appreciated that the distributed DNS described herein may be comprised of one or more conventional processors and unique stored program instructions that control the one or more processors to implement, in conjunction with certain non-processor circuits, some, most, or all of the functions of the distributed DNS described herein. The non-processor circuits may include, but are not limited to, a radio receiver, a radio transmitter, signal drivers, clock circuits, power source circuits, and user input devices. As such, these functions may be interpreted as steps of a method to perform distributed DNS. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for distributed Domain Name Service (DNS) in a wireless communication network comprising the steps of:
   broadcasting by a first node a DNS request message to a second node wherein the DNS request message comprises a hostname of the second node, wherein the DNS request message is modified Ad-Hoc On Demand Distance Vector (AODV) route request message, and information about the first node wherein the information comprises at least one of a network address and a Media Access Control (MAC) address;
   forwarding the DNS request message from the first node to the second node through intermediate nodes in the wireless communication network;
   transmitting by the second node a DNS response message to the first node wherein the DNS response message comprises a Media Access Control (MAC) address of the second node;
   assigning by the second node a local network address of the first node to be stored at the second node; and
   receiving by the second node a data packet from the first node by
     (i) determining whether the first node's MAC address is in a address translation table of the second node;
     (ii) substituting a source network address from the data packet with the local network address of the first node, if it is found;
     (iii) substituting a destination network address from the data packet with the second node's network address; and
     (iv) passing the data packet to a network stack.

2. The method of claim 1 wherein the information is provided to the intermediate nodes so that the intermediate nodes have knowledge of the first node.

3. The method of claim 1 wherein the step of forwarding adheres to the AODV protocol.

4. The method of claim 1 further comprising assigning by the first node a local network address of the second node to be stored at the first node.

5. The method of claim 4 further comprising the steps of:
   receiving at the first node a data packet by
     (i) determining whether the second node's MAC address is in a address translation table of the first node;
     (ii) substituting a source network address from the data packet with the local network address of the second node, if it is found;
     (ii) substituting a destination network address from the data packet with the first Node's network address; and
     (iii) passing the data packet to a network stack.

6. The method of claim 1 further comprising the steps of:
   at the second node:
     obtaining information about the first node from the DNS request message wherein the information comprises at least one of a host name, a Media Access Control (MAC) address, and a network address; and
     updating at least one table of the second node's with the information wherein the at least one table comprises at least one of a hosts table, network layer routing table, an Address Resolution Protocol (ARP) cache, ad-hoc routing table, and address translation table to enable routing of a data packet to the first node.

7. The method of claim 1 wherein the DNS response message further comprises information about the second node wherein the information comprises at least one of a hostname and a network address.

8. The method of claim 1 further comprising the steps of:
   at the first node:
     obtaining information about the second node from the DNS response message wherein the information comprises at least one of a host name, a Media Access Control (MAC) address, and a network address; and
     updating at least one table of the first node's with the information to enable routing of a data packet to the second node.

9. A method for distributed Domain Name Service (DNS) in an ad-hoc wireless communication network wherein the ad-hoc wireless communication network comprises a client, a server, and intermediate nodes between the client and the server, the method comprising the steps of:
   at the client:
     assigning an Internet Protocol (IP) address to the client;
     broadcasting a DNS request message to the ad-hoc wireless communication network wherein the DNS request message is modified Ad-Hoc On Demand Distance Vector (AODV) route request message, wherein the DNS request message comprises a hostname of the server, a hostname of the client and the client's assigned IP address;
     receiving a DNS response message wherein the DNS response message comprises a Media Access Control (MAC) address of the server;
     assigning a local Internet Protocol (IP) address for the server to be stored in an address translation table at the client;
     obtaining information about the server from the DNS response message wherein the information comprises at least one of a host name, a Media Access Control (MAC) address, and an Internet Protocol (IP) address; and
     updating at least one table of the client's with the information wherein the at least one table comprises at least one of a hosts table, IP routing table, an Address Resolution Protocol (ARP) cache, ad-hoc routing table, and address translation table to enable routing of a data packet to the server.

10. The method of claim 9, further comprising the steps of:
    at the server:
      assigning an Internet Protocol (IP) address to the server in the ad-hoc wireless communication network;
      receiving the DNS request message; and
      broadcasting the DNS response message.

11. The method of claim 10 further comprising the steps of:
    obtaining information about the client from the DNS request message wherein the information comprises at least one of a host name, a Media Access Control (MAC) address, and an Internet Protocol (IP) address; and
    updating at least one table of the server's with the obtained information wherein the at least one table comprises at least one of a hosts table, IP routing table, an Address Resolution Protocol ARP cache, ad-hoc routing table, and address translation table to enable data packet to the client.

12. A method for distributed Domain Name Service (DNS) in an ad-hoc wireless communication network wherein the ad-hoc wireless communication network comprises a client, a server, and intermediate nodes between the client and the server, the method comprising the steps of:

at the client:
- broadcasting by the client a DNS Route Request (DNS-RRLQ) message to the ad-hoc wireless communication network wherein the DNS Route request message is modified Ad-Hoc On Demand Distance Vector (AODV) route request message, wherein the DNS-RREQ message comprises a hostname of the server;
- receiving a DNS Route Reply (DNS-RREP) message wherein the DNS-RREP message comprises a Media Access Control (MAC) address of the server;
- assigning a local Internet Protocol (IP) address for the server to be stored in an address translation table at the client;
- obtaining information about the server from the DNS-RREP wherein the information comprises at least one of a host name, a Media Access Control (MAC) address, and an Internet Protocol (IP) address; and
- updating at least one table of the client's with the obtained information wherein the at least one table comprises at least one of a hosts table, IP routing table, an Address Resolution Protocol (ARP) cache, ad-hoc routing table, and address translation table to enable routing of a data packet to the server.

13. The method of claim 12 further comprising the steps of:

at the server:
receiving the DNS-RREQ message; and
broadcasting the DNS_RREP.

14. The method of claim 13 further comprising the steps of:
- obtaining information about the client from the DNS-RREQ wherein the information comprises at least one of a host name, a Media Access Control (MAC) address, and an Internet Protocol (IP) address;
- assigning a local Internet Protocol (IP) address for the client to be stored in an address translation table at the server; and
- updating at least one table of the server's with the obtained information wherein the at least one table comprises at least one of a hosts table, IP routing table, an Address Resolution Protocol ARP cache, ad-hoc routing table, and address translation table to enable routing of a data packet to the client.

15. The method of claim 14 wherein the DNS-RREP message provides knowledge of the server to the intermediate nodes between the client and the server.

* * * * *

UNITED STATES PATENT AND TRADEMARK OFFICE
CERTIFICATE OF CORRECTION

PATENT NO. : 7,562,148 B2  Page 1 of 1
APPLICATION NO. : 11/018301
DATED : July 14, 2009
INVENTOR(S) : Metke et al.

It is certified that error appears in the above-identified patent and that said Letters Patent is hereby corrected as shown below:

In Column 2, Line 59, after "Dynamic Host" delete "Host".

In Column 3, Line 34, delete "DNS-RRLQ" and insert -- DNS-RREQ --, therefor.

In Column 4, Line 55, delete "DNS-RERQ" and insert -- DNS-RREQ --, therefor.

IN THE CLAIMS

In Column 7, Line 63, in Claim 5, delete "(ii)" and insert -- (iii) --, therefor.

In Column 7, Line 65, in Claim 5, delete "(iii)" and insert -- (iv) --, therefor.

In Column 9, Line 2, in Claim 11, delete "ARP" and insert -- (ARP) --, therefor.

In Column 9, Line 12, in Claim 12, delete "RRLQ)" and insert -- RREQ) --, therefor.

In Column 10, Line 8, in Claim 13, delete "DNS_RREP." and insert -- DNS-RREP. --, therefor.

In Column 10, Line 21, in Claim 14, delete "ARP" and insert -- (ARP) --, therefor.

Signed and Sealed this

Thirty-first Day of August, 2010

David J. Kappos
*Director of the United States Patent and Trademark Office*